UNITED STATES PATENT OFFICE 2,307,436

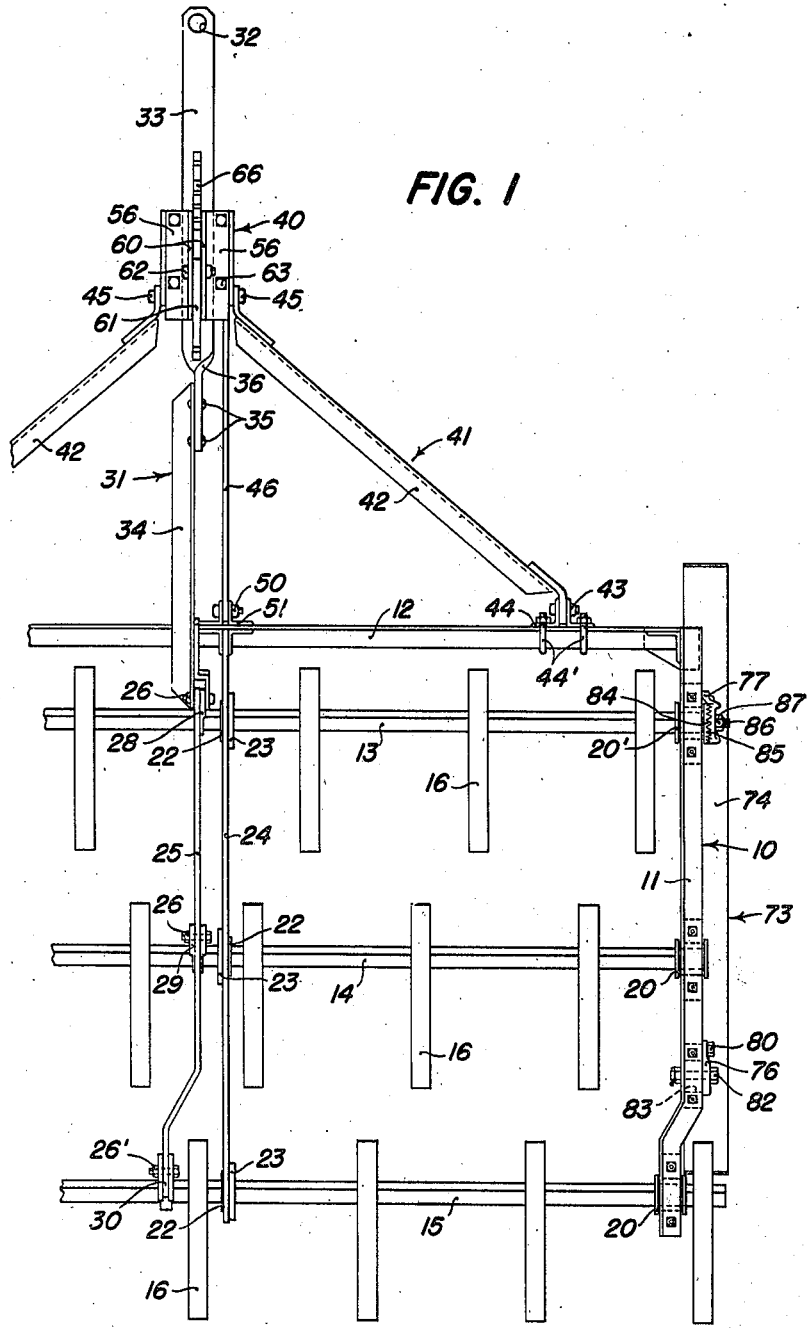

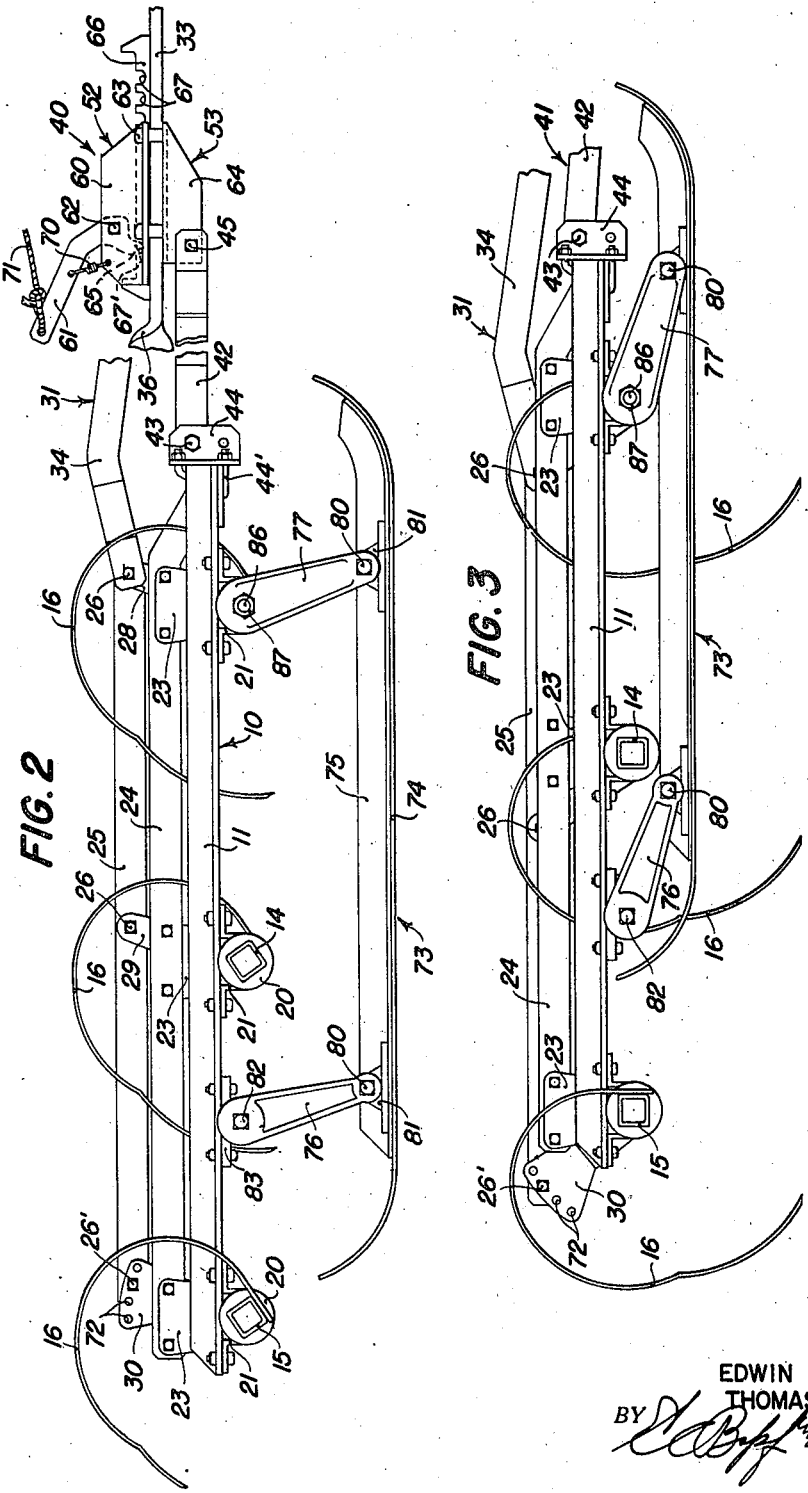

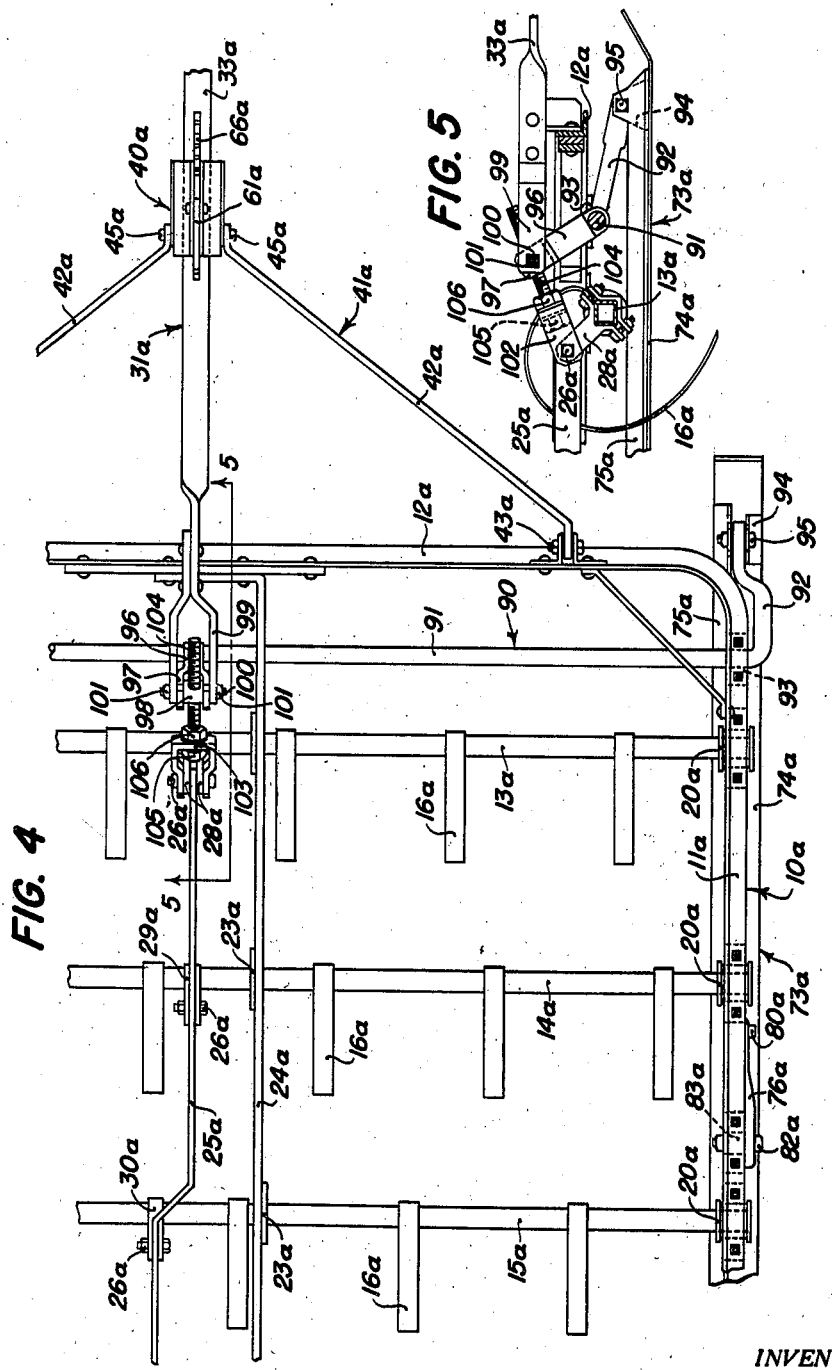

SPRING TOOTH HARROW

Edwin F. Wadelton, Los Angeles, and Thomas M. Thomas, Huntington Park, Calif., assignors to Killefer Manufacturing Corporation, Los Angeles, Calif., a corporation of California Application February 14, 1940, Serial No. 318,866

28 Claims. (Cl. 55—104)

The present invention relates to improvements in tillage implements of the type adapted to be drawn behind a tractor, and more particularly to that class of implements generally known as spring tooth harrows.

The principal object of our invention is the provision of new and improved mechanism mounted on the harrow and connected with the tractor drawbar for raising and lowering the harrow teeth between working and transport positions by the tractive effort of the tractor.

Another object of the present invention is to provide an adjustable connection between the harrow teeth and the runner which supports the harrow frame for transport, whereby the teeth may be adjusted to the proper working angle for any desired working depth.

A further object is the provision of means for simultaneously adjusting the working angle of all the harrow teeth in one operation.

Still another object of the present invention is to provide, in a harrow having a plurality of longitudinally spaced tool carrying bars supported for rocking movement and means for simultaneously rocking all of said bars, adjustable means for changing the angular relation of one of the bars with respect to the others.

These and other objects and advantages of the present invention will become apparent after consideration of the following description of the preferred construction thereof, reference being had to the accompanying drawings, in which Figure 1 is a plan view of a portion of a spring tooth harrow in which our invention is embodied;

Figure 2 is a side elevation of the harrow in transport position;

Figure 3 is similar to Figure 2 but with the harrow in working position;

Figure 4 is a plan view of a portion of a spring tooth harrow, showing another embodiment of our invention; and Figure 5 is a sectional view taken substantially along the line 5—5 in Figure 4.

Referring now to the drawings, and more particularly to Figures 1-3, the harrow comprises a frame 10 made up of longitudinally extending side angle irons 11 (only one of which is shown) connected together at their front ends by a cross member 12. Extending transversely of the frame 10 are a plurality of tooth carrying bars 13, 14 and 15, preferably of square tubular construction, and detachably mounted on each of these bars in any suitable manner are a plurality of the usual spring teeth 16. The opposite ends of the tool bars 13, 14, 15 are provided with flanged bearing members 20 which are journaled in U-shaped bearing supports 21 bolted to the bottoms of the side members 11, whereby the bars have a fore and aft rocking movement with respect to the frame to raise and lower the teeth. By rocking the bars 13, 14, 15 either forwardly or rearwardly, the teeth 16 carried by these bars are rocked to their transport positions as shown in Figure 2, or to their working position as shown in Figure 3. The tool bars 13, 14, 15 are also rotatably supported at their central portions in suitable bearings 22 carried by brackets 23 bolted to and extending downwardly from a longitudinally extending bar 24 which is fixed at its front end substantially at the midpoint of the cross member 12.

The several tooth carrying bars 13, 14, 15 are operatively connected together to rotate in unison by means of a longitudinally extending shifting bar or lever 25 which is pivotally connected at 26 to suitable standards 28, 29, 30 rigidly fixed to and extending upwardly from the bars about midway of their length. The shifting bar 25 is connected at its front end with a longitudinally movable draft member 31 having an aperture 32 at its front end adapted to receive a coupling bolt or clevis for hitch connection with the propelling tractor. In the illustrated construction, the draft member 31 comprises front and rear members 33 and 34 which are rigidly secured together at 35. The rear member 34 is apertured at its rear end to receive the pivot bolt 26 connecting the shifting bar 25 with the lever 28. The front bar 33 is twisted at 36 into a horizontal plane and extends forwardly, in sliding relation, through a head member 40 comprising part of the draft frame by which the harrow is connected to the tractor.

The draft frame is indicated in its entirety by the reference numeral 41 and consists of two forwardly converging members 42 which are pivotally connected for vertical swinging movement at 43 to suitable brackets 44 slidably attached to the cross member 12 by U-bolts 44' providing for lateral adjustment of the brackets 44 along the member 12. Due to the normal amount of looseness in the various pivots, the draft frame 41 may thus be shifted laterally relative to the frame of the harrow to a limited extent, permitting the front end of the draft member 33 to be disposed in line with the center of the harrow. The front ends of the members 42 are pivotally connected at 45 to opposite sides of the head member 40. A bracing bar 46 is pivotally connected at 50 with a bracket 51 fixed substantially at the midpoint of the cross member 12 and extends forwardly therefrom to the pivot connection 45 of the right hand member 42 with the head member 40.

The head member 40 comprises upper and lower sections 52 and 53 spaced apart to receive the draft bar 33. The upper section 52 consists of two angle members 56 having vertical flanges 60 spaced apart laterally to receive a latch lever 61 between them, said latch lever being pivoted on a transverse bolt 62 extending through aligned apertures in the flanges. The lower section 53 is connected with the upper section by bolts 63, and is provided with downwardly extending side flanges 64 to which the draft members 42 and 46 are pivotally connected. The latch lever 61 has a tooth 65, which is adapted to seat in the notches 67, 67' of a rack bar 66 fixed to the top of the draft bar 33 and thereby lock the latter against forward movement with respect to the draft frame 41. A spring 70 is fastened to the lever 61 and anchored to one of the flanges 60 for holding the lever in engagement with the rack bar 66. Secured to the outer end of the lever 61 is a control rope 71 which extends forwardly therefrom to a point adjacent the driver's seat on the tractor.

Under certain conditions it may be desirable to furrow the ground simultaneously with the harrowing operation, and to this end provision has been made for mounting furrowing tools on the rear tool bar 15 in place of the usual harrow spring teeth. As mentioned previously, the teeth 16 are detachably mounted on the tool bars 13, 14, 15, and when the furrowing tools are to be mounted on the rear bar, the teeth 16 are removed therefrom and the furrowing tools secured to the bar in their place. It is usually necessary to adjust the angle of such furrowing tools with respect to the ground, and in order that such adjustment may be made without disturbing the setting of the spring teeth on tool bars 13 and 14, the standard 30 fixed to the rear bar 15 is provided with a plurality of spaced holes 72 arranged in an arc about the axis of the tool bar. The fastening bolt 26' connecting the standard 30 with the shifting bar 25 is adapted to be inserted through any of these holes 72 and thereby affords an angular adjustment of the rear bar 15 with respect to the other bars 13 and 14.

In the present construction the harrow frame 10 is supported on skids or runners 73, although it is manifest that other ground engaging support means, such as wheels, might be used in their place without affecting the operation of our invention. The runner 73 is in the form of a flat bottomed shoe 74 having the front and rear ends thereof turned upwardly. An angle iron strengthening member 75 is fixed to the top of the shoe 74 and extends along the greater part of its length. The runner is connected with the frame by vertically swinging links or arms 76 and 77 which are pivotally connected at 80 with bearing blocks 81 fixed to the runner in any suitable manner. The rear arm 76 is provided at its upper end with a pivot bolt 82 which is journaled in a bearing support member 83 bolted or otherwise fixed to the under side of the frame member 11. The front arm 77 is mounted on the outer end of the front tool bar 13 and is secured thereto so as to swing with the bar by coaxial clutch means which will now be described.

Each of the bearing members 20' on the front bar 13 is provided on its outer face with a plurality of laterally outwardly directed teeth 84 which are adapted to intermesh with corresponding teeth 85 formed on the inner side of the runner arm 77. A threaded stud 86 is fixed to the bearing member 20' and extends outwardly therefrom through a suitable opening in the arm 77. A securing nut 87 is threaded on the stud 86 and bears against the outer face of the runner arm to clamp the arm tightly against the end of the bearing member 20' and thereby maintain the clutch teeth 84, 85 in engagement. Thus, the positions of the runners 73 may be varied to secure different depths of operation without varying the angle of the teeth 16. Conversely, the angle of the teeth may be varied without varying the depth of operation, and of course both angle and depth may be varied where desired.

Assuming that the harrow is in the transport position illustrated in Figure 2, the teeth are adjusted to the proper working angle and depth of penetration in the following manner. The tractor is backed up, exerting a rearward push on the draft member 31, and the latch tooth 65, being disposed behind the pivot 62, is lifted out of the notch 67' against the pressure of the spring 70. The draft member 33 is then pushed rearwardly through the head member 40, rocking the tool bars 13, 14, 15 in a counter-clockwise direction to swing the teeth 16 down into ground engaging position. The front runner arms 77, being connected with the tool bar 13 through the clutch teeth 84, 85, are swung upwardly simultaneously with the downward swinging of the teeth 16, and the runners 73 and teeth 16 assume positions substantially as shown in Figure 3. When the tractor is driven forwardly again, the latch tooth 65 drops into one of the several notches 67 and thereby locks the draft member 31 against further movement relative to the harrow frame. The angle of the teeth 16 with respect to the ground is determined by the proper selection of the notch 67 in which the tooth 65 is engaged, and this selection may be made either while backing up or while driving forwardly—in the latter case the rope 71 being tripped momentarily to release the draft bar 33 and allow the same to move forwardly through the head member 40 to the desired position.

The depth of penetration is adjusted by loosening the nut 87 on the stud 86 sufficiently to allow the teeth 85 to clear the teeth 84, and the harrow frame 10 is then raised or lowered manually to the desired height above the ground while the runner arm 77 swings freely to accommodate such change. When the desired adjustment has been secured, the nut 87 is again tightened up, clamping the clutch teeth 84, 85 into engagement and locking the arm 77 secure to the tool bar 13.

The harrow is raised to transport position by pulling on the control rope 71, which releases the latch tooth 65 from its notch 67. The draft force of the tractor pulls the released draft bar 31 forwardly through the head member 40, rocking the tool bars 13, 14, 15 in unison and swinging the teeth 16 and runners 73 to the positions shown in Figure 2.

Another embodiment of our invention is illustrated in Figures 4 and 5, and referring now to these drawings, it is seen that certain structural elements are similar to those just described in the preceding structure, hence such elements are given the same reference numerals with the suffix *a*.

The front end of the harrow frame 10a is supported on the runners 73a by means of a bail 90 comprising a transverse rock shaft portion 91 disposed ahead of and parallel to the front tool bar 13a and having the outer ends thereof bent downwardly and forwardly to form arms 92. The rock shaft 91 is rotatably supported adjacent the arms 92 in suitable bearing support members 93 bolted or otherwise fixed to the undersides of the frame side members 11a. The outer end of each arm 92 is pivotally connected with a bracket 94 on the runner by means of a pivot bolt 95.

Fixed to the center of the rock shaft 91 is an upwardly extending arm 96 having a bifurcated outer end 97 adapted to embrace a trunnion block 98. The rear end 99 of the draft member 31a is likewise forked and embraces the end 97 of the arm 96. The trunnion block 98 has laterally outwardly extending pivots 100 which extend through aligned openings in the arm 96 and draft member 31a and which are threaded at their outer ends to receive nuts 101.

As in the preceding construction, the tool bars 13a, 14a, and 15a are joined together to rotate in unison by means of a shifting bar 25a. The tool bars are also connected with the rock shaft 91 so as to rotate therewith, and it is with this last named connection that our invention is primarily concerned. A U-shaped strap 102 embraces the lever 28a on the front bar 13a and is pivotally connected therewith by the pivot bolt 26a. The bight portion 103 of the strap is apertured, and a threaded rod 104 extends forwardly through such aperture with a nut 105 bearing against the inside of the bight. A nut 106 is welded on the rod 104 outside of the bight 103. The forward portion of the rod 104 is received in a suitably threaded aperture in the trunnion block 98 and cooperates therewith to form an extensible connection between the levers 96 and 28a.

To adjust the harrow to the desired depth and angle of penetration, the harrow frame 10a is first raised or lowered on the runners 73a by driving the tractor either forward or in reverse with the latch lever 61a disengaged from the rack bar 66a. The relative longitudinal movement of the draft member 31a rocks the shaft 91, swinging the arms 92 up or down, as the case may be, and the lever 61a is then released to lock the connection in the selected position. The teeth 16a are then adjusted to the proper working angle by turning the rod 104 by means of the nut 106 in one direction or the other to advance the rod through the trunnion block 98 or back the rod out. Advancing the rod 104 through the trunnion block 98 has the effect of shortening the connection between levers 96, 28a, and since lever 96 is locked against movement by the latch lever 61a and rack bar 66a, it follows that the lever 28a together with the shifting bar 25a and levers 29a and 30a must move forwardly, rocking the tool bars 13a, 14a, 15a in a clockwise direction and thereby changing the angle of the teeth 16a. In like manner, backing the rod 104 out of the trunnion block 98 rocks the tool bars 13a, 14a, 15a in a counterclockwise direction.

What we claim as our invention is:

1. A harrow comprising a frame, a transversely disposed tool carrying bar supported thereon for rocking motion, a rock shaft journaled on said frame, ground engaging support means connected with said rock shaft and movable vertically thereby, and adjustable means connecting said tool bar with said rock shaft for rotation therewith.

2. A harrow comprising a frame, a plurality of longitudinally spaced tooth carrying bars journaled on said frame, means connecting said bars together to rotate in unison, a rock shaft journaled on said frame, ground engaging support means connected with said rock shaft so as to swing vertically when the shaft is rocked, and means operatively connecting said tooth carrying bar with said rock shaft to rotate therewith including means for adjusting the angular relation of the bar with respect to the rock shaft.

3. A harrow comprising a frame, a tool carrying bar journaled thereon, an arm fixed to said bar, a rock shaft disposed parallel to said tool bar and having an arm fixed thereto, ground engaging support means connected with said rock shaft so as to swing vertically relative to the frame when the shaft is rocked, and extensible link means connecting said arms whereby said tool bar and said rock shaft are made to rotate in unison.

4. A harrow comprising a frame, a transversely disposed bar journaled on said frame for rocking movement and having a plurality of earth working teeth fixedly secured thereto, a rock shaft journaled on said frame substantially parallel to said bar, ground engaging support means connected with said rock shaft so as to swing vertically relative to the frame when the shaft is rocked, a pair of arms fixed to said rock shaft and to said tool bar, respectively, and means interconnecting said arms including a first member pivoted on one of said arms and a second member pivoted on the other arm, said second member being adjustable with respect to said first member to increase or decrease the length of said interconnecting means.

5. A harrow comprising a frame, a longitudinally movable draft member having hitch means adapted for connection with a tractor, a plurality of transversely disposed tool carrying bars journaled on said frame for rocking motion and connected together to rotate in unison, a rock shaft journaled on said frame, a ground engaging runner connected with said rock shaft so as to swing vertically relative to the frame when the shaft is rocked, means interconnecting said tool bars with said rock shaft including a pair of arms fixed to said rock shaft and to one of the tool bars, respectively, a first member pivoted to the free end of one of said arms, and a second member pivoted to the free end of the other arm, said second member being adjustable relative to said first member to increase or decrease the distance between said free ends of the arms, and operating connection between said draft member and said interconnecting means.

6. A harrow comprising a frame, a transversely disposed tool carrying bar journaled on said frame for rocking motion, a rock shaft having ground engaging support means connected therewith so as to swing vertically relative to the frame when the shaft is rocked, a pair of arms fixed to said tool bar and said rock shaft, respectively, a pair of cooperating threaded members, one of said members being connected with one of said arms and the other member being connected with the other arm, and means for advancing one of said members with respect to the other.

7. A harrow comprising a frame, a draft member supported on said frame for fore and aft movement and having hitch means at the front end thereof for connection with a tractor, a plurality of longitudinally spaced tool carrying bars journaled on said frame and connected together to rotate in unison, a transversely disposed rock shaft journaled on said frame, ground engaging means connected with said rock shaft so as to move vertically relative to the frame when the shaft is rocked, a pair of arms fixed to said rock shaft and to one of said tool bars, respectively, a pair of cooperating threaded members, one of said members being pivotally connected with the tool bar arm, and pivot means connecting the other of said members with said rock shaft arm, said draft member being connected at its rear end to said pivot means whereby fore and aft movement of the draft member causes said rock shaft and said tool bars to rock simultaneously.

8. An agricultural implement comprising a frame, tool means, a bar supported on the frame for rocking movement and operatively connected with said tool means, a rock shaft journaled on said frame, ground engaging support means connected with said rock shaft and movable therewith, and adjustable means connecting said tool bar with said rock shaft for rotation therewith in adjusted relation.

9. A harrow comprising a frame, a plurality of longitudinally spaced tooth carrying bars journaled on said frame and connected together for rocking movement in unison, a draft member movable longitudinally with respect to the frame and having hitch means for connection with a propelling tractor, said draft member being operatively connected with said bars to rock the same, a hitch frame comprising rearwardly diverging bars and means at their forward end movably receiving the forward end of said longitudinally movable draft member, and laterally adjustable clamp means connecting the rear ends of said divergent bars to said harrow frame in laterally adjusted positions, the connections between said longitudinally movable draft member and said hitch frame and said bars being adapted to accommodate limited lateral movement of said draft member relative thereto when the position of said hitch frame is adjusted relative to the harrow frame.

10. A harrow comprising frame means including a front transverse bar, tool means connected with said frame means, a hitch frame including rearwardly diverging bars and a generally longitudinally extending bar, and means connecting said hitch frame bars together at their forward ends, means connecting the rear end of said longitudinal bar to said front transverse bar, and laterally adjustable clamp means connecting the rear ends of said divergent bars to said front transverse bar in laterally adjusted positions.

11. An implement comprising a frame including a front bar and a pair of side bars rigidly connected together, a plurality of transverse tool bars disposed in fore and aft spaced relation and rockably connected with said side bars, two pairs of runner arms swingably connected with said side bars in depending relation, a runner connected with the lower ends of the arms at each side of said frame, tools fixed to said tool bars for swinging movement therewith, a hitch frame connected with said implement frame, a longitudinally extending hitch member mounted for movement relative to said hitch frame, latch means for locking said hitch member in retracted or extended position on the hitch frame, arm and link means connecting all of said tool bars to cause them to swing together, a link pivotally connected at its rear end with said arm and link means, and connected at its forward end with said movable hitch member, whereby movement movement of the latter into one position disposes said tools and said runners in a given position one with respect to the other, said latch means locking said movable hitch member in said one position and serving thereby to hold said tools and runners substantially in said given position, and means providing relative adjustment between said tools and runner arms while said tool bars and associated tools are held in a given position for varying the depth of operation of said tools.

12. An implement comprising a frame including side bars, a plurality of transverse tool bars disposed in fore and aft spaced relation, bearing sleeves non-rotatably mounted on the ends of said tool bars journaled for rocking movement on said side bars, the laterally outer ends of the bearing sleeves for the forwardmost bar extending beyond the sides of said side bars and formed with axially outwardly facing serrations, a runner arm having companion serrations and adapted to fit in axially abutting relation against each serrated end of said forwardmost bearing sleeves, and means securing each arm to the associated bearing sleeve to hold said serrations in interlocked relation.

13. An implement comprising a frame including side bars, a plurality of transverse tool bars disposed in fore and aft spaced relation, bearing sleeves non-rotatably mounted on the ends of said tool bars journaled for rocking movement on said side bars, the laterally outer ends of the bearing sleeves for the forwardmost bar extending beyond the sides of said side bars and formed with axially outwardly facing serrations, a runner arm having companion serrations and adapted to fit in axially abutting relation against each serrated end of said forwardmost bearing sleeves, means securing each arm to the associated bearing sleeve to hold said serrations in interlocked relation, a second pair of arms swingably connected with said frame side bars at a point between the adjacent tool bars, and a pair of ground engaging runners, each pivotally connected with one of said first mentioned arms and one of said second pair of arms.

14. A harrow comprising a rigid frame having a pair of side bars, tooth bars rockably connected at their ends with said pair of side bars, bearing sleeves non-rotatably associated with said tooth bars, the laterally outer ends of the bearing sleeves for the forwardmost bar extending beyond the sides of said side bars, a pair of runner arms fixed to the laterally outer ends of said forwardmost bearing sleeves, respectively, a second pair of runner arms swingably connected with said side bars, and a pair of ground engaging runners connected with said runner arms.

15. A harrow comprising a rigid frame having a pair of side bars, tooth bars rockably connected at their ends with said pair of side bars, bearing sleeves non-rotatably associated with said tooth bars, the laterally outer ends of the bearing sleeves for the forwardmost bar extending beyond the sides of said side bars, a pair of runner arms fixed to the laterally outer ends of said forwardmost bearing sleeves, respectively, and ground engaging runners connected with said arms.

16. A harrow comprising a main frame, a hitch frame pivoted to said main frame for movement about a transverse axis, a transverse bar rockable on said main frame, ground engaging runners controlled by said bar, an arm fixed to said bar, a fore and aft extending draft member slidable longitudinally on and swingable with said hitch frame, means including a link pivotally connecting said draft member with said arm, and latch means optionally fixing said draft member to said hitch frame at different points.

17. A harrow comprising a main frame, a hitch frame pivoted to said main frame for movement about a transverse axis, a transverse tool bar rockable on said main frame, teeth on said bar, an arm fixed to said bar, a fore and aft extending draft member slidable longitudinally on said hitch frame, a transverse rock shaft mounted on said main frame, ground engaging runners controlled by said rock shaft, means including a link pivotally connected at its forward end with said slidable draft member and at its rear end with said rock shaft, means connecting the latter with said rockable tool bar, and latch means optionally fixing said draft member to said hitch frame at different points.

18. A harrow comprising a main frame, a hitch frame pivoted to said main frame for movement about a transverse axis, a transverse tool bar rockable on said main frame, teeth on said bar, an arm fixed to said bar, a fore and aft extending draft member slidable longitudinally on said hitch frame, means including a link pivotally connected at its forward end with said slidable draft member and at its rear end with said arm, latch means optionally fixing said draft member to said hitch frame at different points, and means for adjusting the effective length of said link.

19. A harrow comprising a main frame, a hitch frame pivoted to said main frame for movement about a transverse axis, a plurality of tooth bars rockably mounted on said main frame, teeth on said tooth bars, an arm fixed to one of the tooth bars and extending upwardly, means connected with said arm for causing all of said tooth bars to rock together, depending arms secured to the ends of said one tooth bar, other depending arms swingably connected with the main frame, runners connected with said depending arms, a fore and aft extending draft member slidable longitudinally on said hitch frame, means including a link pivotally connecting said draft member with said first mentioned arm, and latch means optionally fixing said draft member to said hitch frame at different points for determining the positions of said interconnected tooth bars and runners relative to the main frame.

20. A harrow comprising a rigid frame having a pair of side bars, tooth bars rockably connected at their ends with said pair of side bars, a generally triangular hitch frame pivotally connected with said side bars for vertical swinging movement, a head member secured to the apical portion of said hitch frame, a longitudinally extending draft member slidable through said head member, means operatively connecting said draft member with the intermediate portions of said tooth bars, and latch means optionally fixing said draft member to said head member in optionally different positions relative thereto.

21. An implement comprising a frame including a front bar and a pair of side bars rigidly connected together, tooth bars rockably connected with said side bars, a generally triangular hitch pivotally connected with said front bar for vertical swinging movement, a head member secured to the apical portion of said hitch frame, a longitudinally extending draft member slidable through said head member, means operatively connecting said draft member with the intermediate portions of said tooth bars, and latch means optionally fixing said draft member to said head member in optionally different positions relative thereto.

22. A harrow comprising a rigid frame having a pair of side bars, tooth bars rockably connected at their ends with said pair of side bars, a generally triangular hitch frame pivotally connected with said side bars for vertical swinging movement, a head member secured to the apical portion of said hitch frame, a longitudinally extending draft member slidable through said head member, means operatively connecting said draft member with the intermediate portions of said tooth bars, swingably mounted runners connected with at least one of said tooth bars, and latch means optionally fixing said draft member to said head member in optionally different positions relative thereto for determining the positions of said interconnected tooth bars and runners relative to the said side bars.

23. A harrow comprising a rigid frame having a pair of side bars, tooth bars rockably connected at their ends with said pair of side bars, a generally triangular hitch frame pivotally connected with said side bars for vertical swinging movement, a head member secured to the apical portion of said hitch frame, a longitudinally extending draft member slidable through said head member, means operatively connecting said draft member with the intermediate portions of said tooth bars, swingably mounted runners connected with at least one of said tooth bars, means for adjusting the position of the runners relative to the tooth bars, and latch means optionally fixing said draft member to said head member in optionally different positions relative thereto for determining the positions of said interconnected tooth bars and runners relative to the said side bars.

24. A harrow comprising a main frame, a hitch frame pivoted to said main frame for movement about a transverse axis, a plurality of tooth bars rockably mounted on said main frame, teeth on said tooth bars, an arm fixed to one of the tooth bars and extending upwardly, a force and aft extending draft member slidable longitudinally on said hitch frame, means including a link pivotally connecting said draft member with said arm, a rock shaft journaled on said frame and having runner arms at its ends, means connecting said rock shaft with said slidable draft member and said link, runners connected at their forward ends with said runner arms, other arms swingably connecting the rear ends of said runners with said main frame, and latch means optionally fixing said draft member to said hitch frame at different points.

25. A harrow comprising a main frame, a hitch frame pivoted to said main frame for movement about a transverse axis, a plurality of tooth bars rockably mounted on said main frame, teeth on said tooth bars, an arm fixed to one of the tooth bars and extending upwardly, a fore and aft extending draft member slidable longitudinally on said hitch frame, a rock shaft journaled on said frame and having runner arms at its ends, means connecting said rock shaft with said slidable draft member, means including extensible link means connecting said rock shaft with said arm, means for causing all of said tool bars to rock together, and latch means optionally fixing said draft member to said hitch frame at different points.

26. An implement comprising a frame including a front bar and a pair of side bars rigidly connected together, a plurality of transverse tool bars disposed in fore and aft spaced relation, bearing sleeves non-rotatably mounted on the ends of said tool bars journaled for rocking movement on said side bars, the laterally outer ends of the bearing sleeves for the forwardmost bar extending beyond the sides of said side bars and formed with axially outwardly facing serrations, a runner arm having companion serrations and adapted to fit in axially abutting relation against each serrated end of said forwardmost bearing sleeves, means securing each arm to the associated bearing sleeve to hold said serrations in interlocked relation, a second pair of arms swingably connected with said frame side bars at a point between the adjacent tool bars, a pair of ground engaging runners, each pivotally connected with one of said first mentioned arms and one of said second pair of arms, tools fixed to said tool bars for swinging movement therewith, a hitch frame pivotally connected with said implement frame, a longitudinally extending hitch member mounted for sliding movement on said hitch frame, latch means for locking said hitch member in retracted or extended position on the hitch frame, arm and link means connecting all of said tool bars to cause them to swing together, a link pivotally connected at its rear end with said arm and link means and connected at its forward end with said slidable hitch member, whereby movement of the latter into one position disposes said tools and said runners in a given position one with respect to the other, said latch means locking said slidable hitch member in said one position and serving thereby to hold said tools and runners substantially in said given position, and the means securing said serrated runner arms to the serrated ends of the associated bearing sleeves being releasable so as to provide for the adjustment of both pairs of said runner arms and said runners while said tool bars and associated tools are held in a given position for varying the depth of operation of said tools.

27. An implement comprising a frame, a plurality of transverse tool carrying bars journaled on said frame in fore and aft spaced relation, harrowing tools on all except the rear bar, the latter being adapted to receive furrowing tools, and means for simultaneously rocking all of said bars together including means for adjusting said rear tool carrying bar angularly with respect to the other bars so as to adjust the position of the furrowing tools relative to the ground without changing the setting of said harrowing tools.

28. An implement comprising a frame, a plurality of transverse tool carrying bars journaled on said frame in fore and apt spaced relation, harrowing tools on all except the rear bar, the latter being adapted to receive furrowing tools, an apertured arm on each of said bars, the arm on the rear bar having a plurality of opertures, a link pivotally connecting said arms to cause said bars to rock together, the plurality of apertures in the rear arm providing for attachment of said rear arm to said link in a plurality of different positions, and means connected with the forward arm for rocking all of said bars simultaneously.

EDWIN F. WADELTON.
THOMAS M. THOMAS.

CERTIFICATE OF CORRECTION.

Patent No. 2,307,436.                                          January 5, 1943.

EDWIN F. WADELTON, ET AL.

It is hereby certified that error appears in the printed specification of the above numbered patent requiring correction as follows: Page 4, second column, line 3, strike out "movement"; page 5, second column, line 49, claim 24, for "force" read --fore--; and that the said Letters Patent should be read with this correction therein that the same may conform to the record of the case in the Patent Office.

Signed and sealed this 9th day of February, A. D. 1943.

Henry Van Arsdale,
Acting Commissioner of Patents.

(Seal)